(12) United States Patent
Shih-Tsung

(10) Patent No.: US 7,082,039 B2
(45) Date of Patent: Jul. 25, 2006

(54) SLOT ARRANGEMENT MOTHERBOARD ASSEMBLY

(75) Inventor: Chen Shih-Tsung, Taipei (TW)

(73) Assignee: Shuttle Inc., Taipei (TW)

( * ) Notice: Subject to any disclaimer, the term of this patent is extended or adjusted under 35 U.S.C. 154(b) by 271 days.

(21) Appl. No.: 10/727,395

(22) Filed: Dec. 3, 2003

(65) Prior Publication Data

US 2004/0184253 A1    Sep. 23, 2004

(30) Foreign Application Priority Data

Dec. 6, 2002    (TW) .............................. 91219815 U

(51) Int. Cl.
*H05K 7/14*    (2006.01)
*H05K 7/18*    (2006.01)

(52) U.S. Cl. ..................................... 361/801

(58) Field of Classification Search ................ 361/801, 361/788, 785, 777, 752, 797; 257/712, 723, 257/710

See application file for complete search history.

(56) References Cited

U.S. PATENT DOCUMENTS 6,118,670 A * 9/2000 Radford et al. ............. 361/777
6,324,075 B1 * 11/2001 Unrein et al. ............... 361/816

* cited by examiner

*Primary Examiner*—Kamand Cuneo
*Assistant Examiner*—Ivan Carpio
(74) *Attorney, Agent, or Firm*—Fenwick & West LLP

(57) ABSTRACT

On a motherboard, a first slot for receiving a high-performance component that typically generates higher levels of heat and emissions is mounted next to a second slot for receiving a card that generates relatively lower levels of heat and emissions. The second slot is positioned between the first slot and the central processing unit (CPU) socket on the motherboard. Through this configuration, a CPU can be shielded from the heat and electromagnetic interference generated by with a high-performance component. The first slot can be positioned near the edge of the motherboard, further facilitating heat dissipation and access to the slot. In an embodiment, the first slot is an AGP slot and the second slot is a PCI slot.

10 Claims, 3 Drawing Sheets

SLOT ARRANGEMENT MOTHERBOARD ASSEMBLY

CROSS REFERENCE TO RELATED APPLICATIONS

This application claims the right of priority based on Taiwanese application serial no. 091219815, filed Dec. 6, 2002, which is herein incorporated in its entirety by reference.

BACKGROUND

1. Field of the Invention

This invention relates generally to a motherboard, and more specifically to a motherboard configured to enhance the thermal, EMI, and installation characteristics of a computer.

2. Background of the Invention

Advances in integrated circuit technology have driven down the size of computer chips relative to their performance. Cards to support or enhance sound, graphics, networking, and other peripheral features may be mounted directly on computer motherboards in close proximity to the central processing unit (CPU). Components such as high-performance Accelerated Graphics Port (AGP) cards can generate considerable amounts of heat and electromagnetic interference (EMI) during operation. When combined with the existing heat within the computer generated primarily by the CPU, the heat from such components can damage or shorten the useful lifetime of the computer. If not properly shielded, EMI from such components can also disrupt the operation of other components, causing degradation in system performance. The heat and EMI problems caused by such components are exacerbated in the case of smaller motherboards, for instance those designed to fit within small form factor computers.

Reductions in motherboard and computer size have also put a premium on computer component installation and access space. This has been an issue in particular for relatively larger components that are difficult to install and components that are more likely to be accessed during a computer's lifetime. There is a need for motherboard designs to address these access problems.

The prior art, as depicted in FIG. 1, does not adequately address these design challenges. As shown in FIG. 1, an AGP slot 1 is located on a motherboard 4 next to the CPU socket 3. Besides the CPU, AGP cards typically generate the greatest amounts of heat and emissions during operation due to their high performance capabilities. The prior art configuration thus places two of the hottest motherboard components within close proximity of each other. Also, because there is no slot to install a component between a CPU and AGP card, leaving the CPU completely exposed to the heat and emissions generated by the card. In addition, the AGP slot 1 is located behind the PCI slot 2. Access to the AGP slot 1 from the edge of the motherboard 4 thus requires maneuvering around the PCI slot 2 and any card installed therein. Other components, such as the power and memory modules are also mounted on the motherboard 4.

Therefore, there is a need for apparati to isolate motherboard components that generate large quantities of heat and electromagnetic emissions from the central processing unit (CPU) of a computer. There is also a need for apparati that can facilitate installation of and access to large motherboard components.

SUMMARY OF THE INVENTION

Accordingly, the invention allows for isolation of high performance motherboard components from the CPU of a computer and improves access to these motherboard components. Specifically, a first slot designed to receive a card that can generate high levels of heat and electromagnetic emissions is positioned on a motherboard away from the CPU socket. A second slot, also designed to receive a card, is mounted on the motherboard in between the CPU socket and the first slot. Through this configuration, a component installed in the first slot may be effectively shielded from the CPU by a component installed in the second slot, thus reducing the risk of heat damage or EMI interference from the component in the first slot.

By isolating the motherboard components that generate the most heat from each other, the invention reduces the chance of hot spots developing on the motherboard. At the same time, in an embodiment, the first slot is a designed to receive a large computer card and is positioned close to an edge of the motherboard, and there is no card slot to receive a component that could obstruct access to the first slot. By virtue of its placement on the motherboard, the first slot and any component installed in it are separated from the heat and emissions generated by the CPU, and also can be easily accessed.

In an embodiment of the invention, the first slot is an AGP slot and the second slot is a PCI slot. In another embodiment, the motherboard is for use in a small form factor computer.

DETAILED DESCRIPTION OF THE PREFERRED EMBODIMENTS

Figure 2:
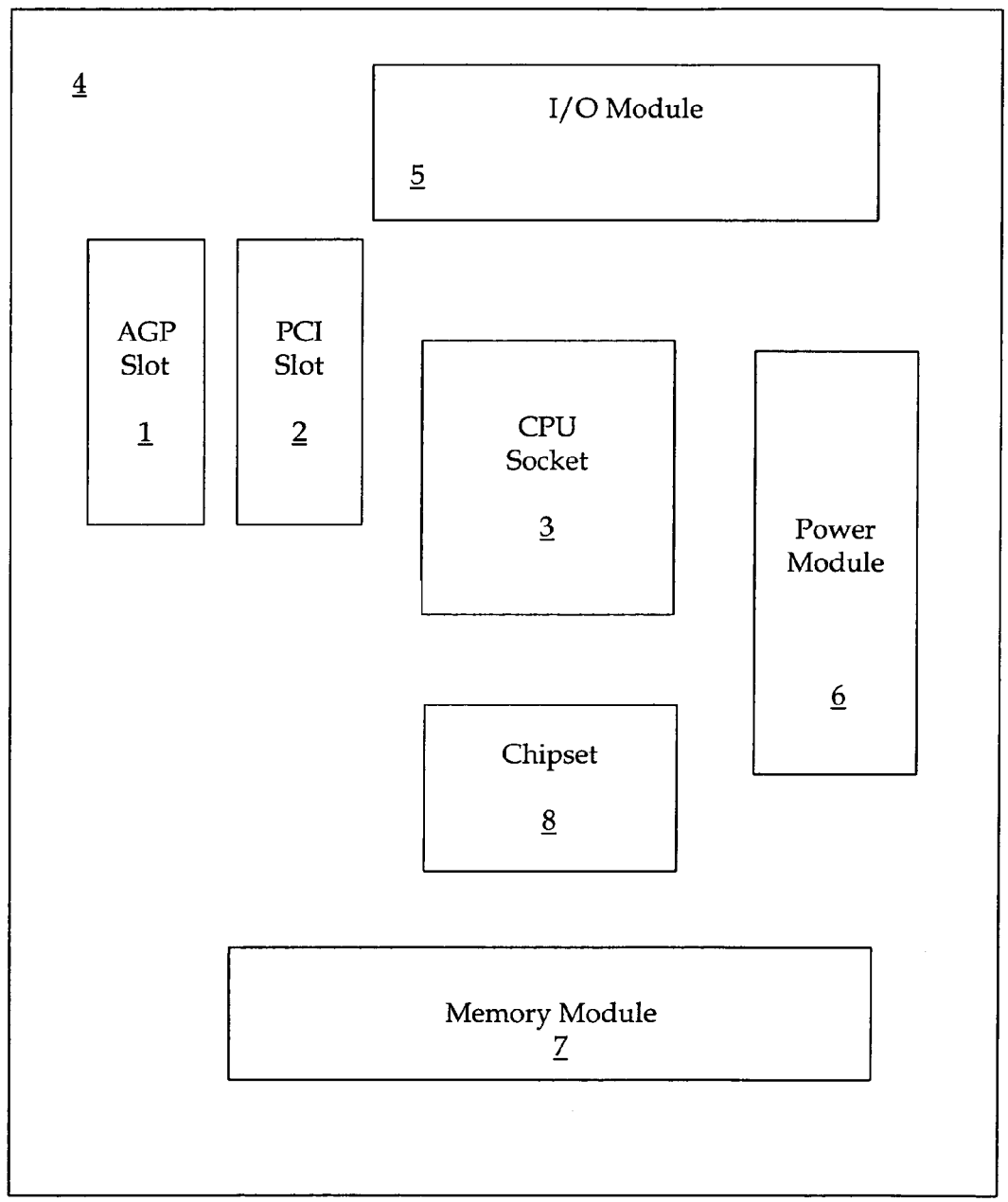
FIG. 2 is a schematic of a motherboard in accordance with one embodiment of the invention.
Figure 3:
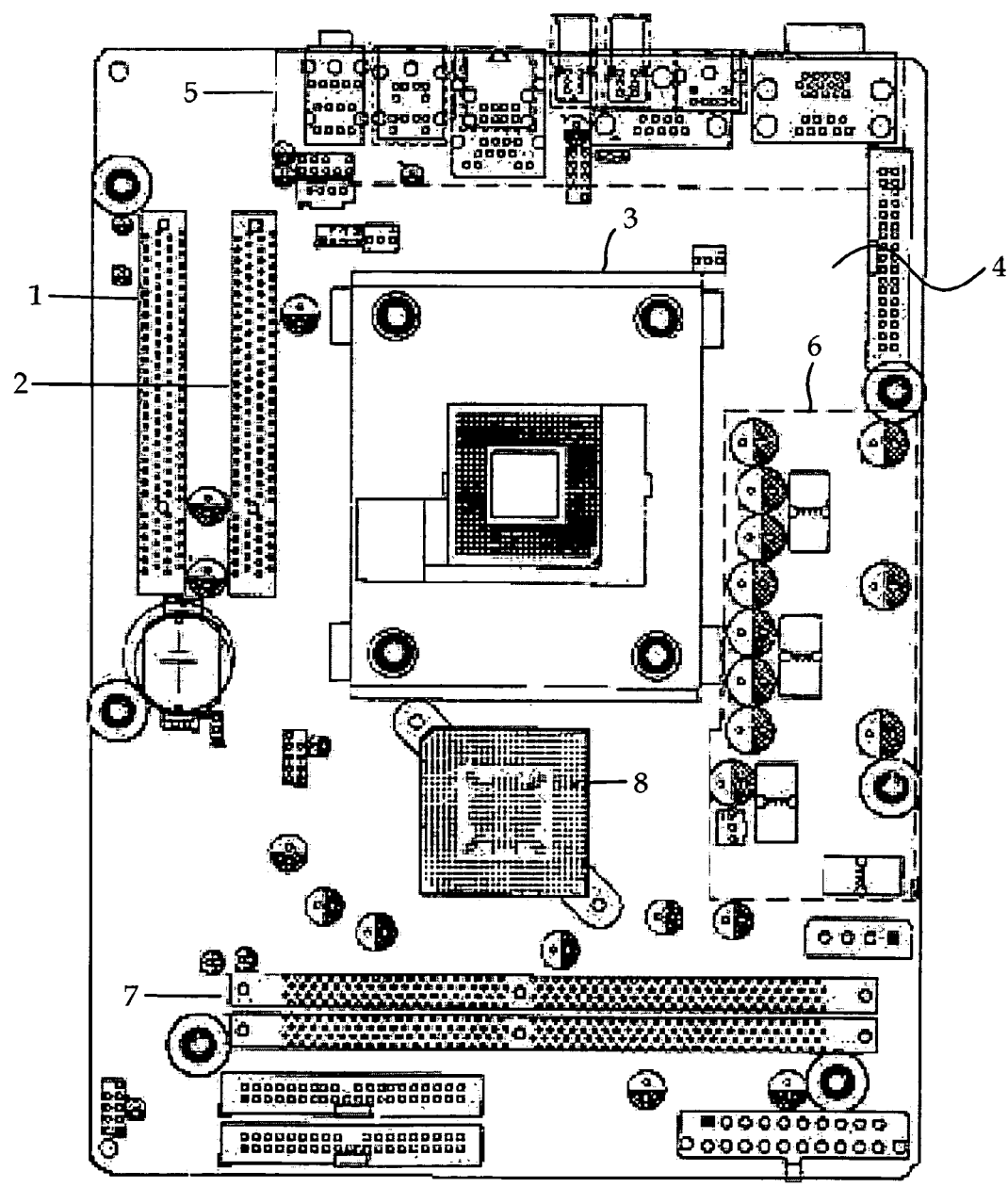
FIG. 3 is a plan view of a motherboard assembly in accordance with one embodiment of the invention.

FIG. 2 depicts a schematic of a motherboard assembly in accordance with one embodiment of the invention. As shown in the diagram, a CPU socket 3 is positioned in a central region of a motherboard 4. Between the CPU socket 3 and one edge of the motherboard 4, there are two slots 1 and 2 for receiving two different kinds of cards. In one embodiment, the first slot is an AGP slot 1 for receiving an AGP card, and the second slot is a PCI slot 2 for receiving various types of sound or other cards. Alternatively, however, slot 1 may be another type of slot that is designed to receive a card that typically generates greater levels of emissions heat than a card that the second slot 2 is designed to receive.

The second slot 2 is positioned between the first slot 1 and the CPU socket 3, thus enabling a card installed in the first slot 1, and the emissions and heat it generates, to be isolated from a CPU (not shown). In addition, the first slot 1 is located near an edge of the motherboard 4, and no slot is mounted between the first slot 1 and the edge. This affords easy access to the slot and any components mounted thereon. It also facilitates heat dissipation from the AGP card. Although the two slots 1 and 2 are depicted as being located in the upper left quadrant of the motherboard 4, they may be located at various locations on the motherboard 4 in accordance with other embodiments of the invention.

Figure 1:
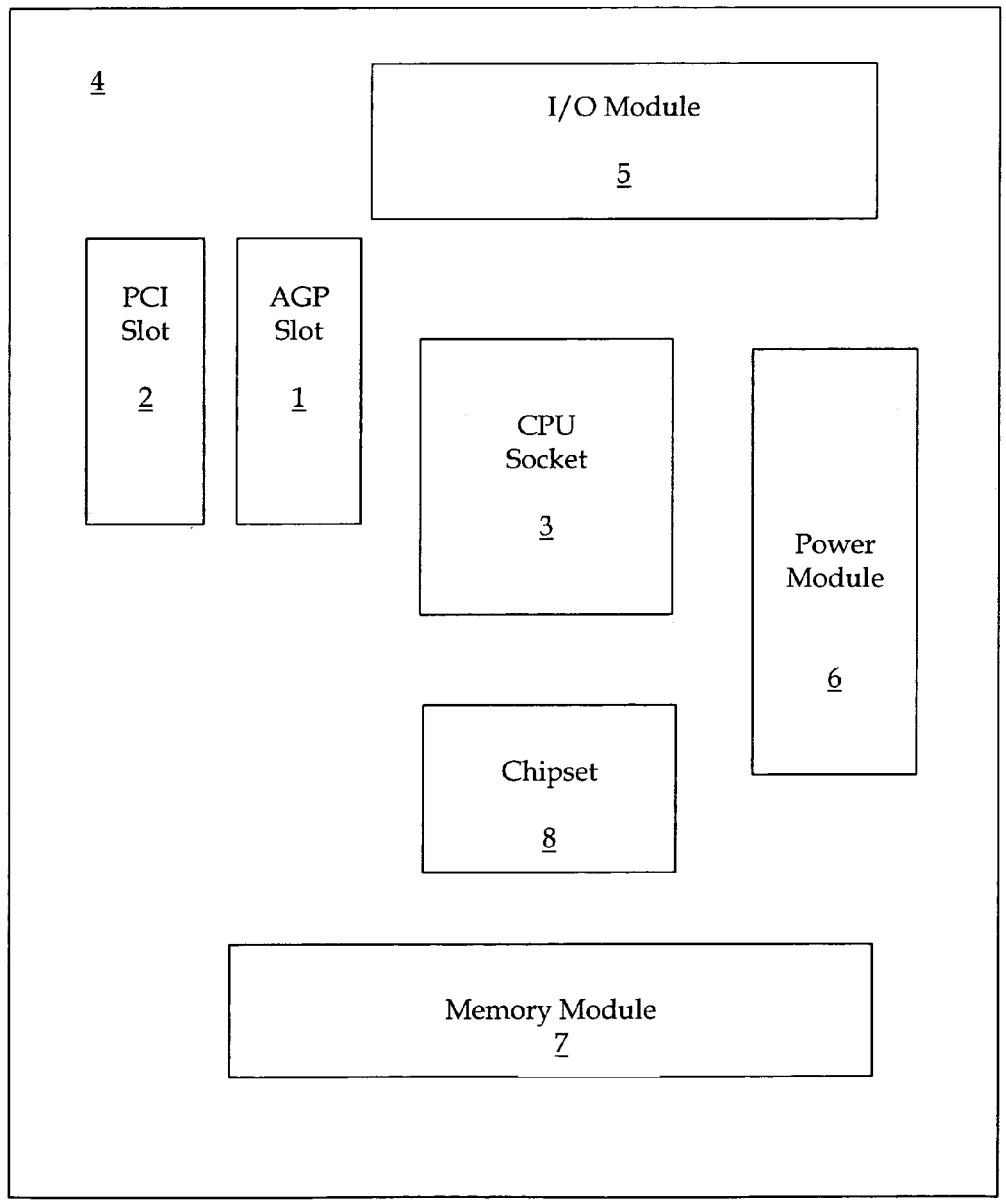
FIG. 1 is a schematic of a prior art motherboard.

As shown in FIG. 1, various other components may be installed on the motherboard 4. In the embodiment depicted, an input/output module 5 is located along the front edge of the motherboard 4, a power module 6 borders the edge of the motherboard 4 opposite to the edge located next to the first slot 1, a memory module 7 is mounted along the rear edge of the motherboard 4, and a chipset 8 is located between the CPU socket 3 and the memory module 7. The specific components used may vary. For instance, the input output module can support USB, VGA, or other connectors. In another example, the chipset may be a north bridge, south bridge, combination north and south bridge, or another chipset. In addition, various other components, or even the same components in various configurations, can also be used.

FIG. 2 shows a plan view of a motherboard 4 corresponding to the schematic in FIG. 1, with like reference numerals corresponding to like components on the motherboard 4. FIG. 2 illustrates an embodiment of a motherboard 4 for a small form factor computer; however, the invention can be implemented in any sized computer.

The foregoing description of the embodiments of the invention has been presented for the purpose of illustration; it is not intended to be exhaustive or to limit the invention to the precise forms disclosed. The figures are not necessarily drawn to scale. Persons skilled in the relevant art can appreciate that many modifications and variations are possible in light of the above teachings. It is therefore intended that the scope of the invention be limited not by this detailed description, but rather by the claims appended hereto.

I claim:

1. A motherboard assembly comprising:
   a motherboard;
   a socket for receiving a central processing unit mounted on the motherboard;
   a first slot for receiving a first computer card;
   a second slot for receiving a second computer card, wherein the second slot is positioned between the central processing unit and the first slot, and the first computer card is one that generates greater heat during operation than the second computer card.

2. The motherboard assembly of claim 1, wherein the first slot is an AGP slot.

3. The motherboard assembly of claim 2, wherein the second slot is a PCI slot.

4. The motherboard assembly of claim 1, wherein the motherboard is for use in a small form factor computer.

5. The motherboard assembly of claim 1, wherein the first slot is located adjacent to an edge of the motherboard and oriented parallel to the edge.

6. The motherboard assembly of claim 1, wherein no additional card slot is located between the first slot and an edge of the motherboard adjacent to the edge.

7. The motherboard assembly of claim 1 wherein the first slot is an AGP slot, the second slot is a PCI slot; the first slot is located adjacent to an edge of the motherboard oriented parallel to the first slot, wherein no other slot is located between the first slot and the edge, the first and second slots are mounted on the motherboard parallel and adjacent to each other.

8. The motherboard assembly of claim 7, further comprising, on the motherboard:
   an input/output module containing a plurality of ports for connecting the computer to external devices, the input/output module located adjacent to an edge of the motherboard perpendicular to the edge of the motherboard that is adjacent to the first slot;
   a power supply module located adjacent to an edge of the motherboard opposite the edge of the motherboard that is adjacent to the first slot;
   a memory module for receiving a memory card; and
   a chipset mounted on the motherboard between the memory module and the socket.

9. The motherboard assembly of claim 1, wherein the first computer card is larger than the second computer card.

10. The motherboard assembly of claim 9, wherein the first slot is positioned adjacent to an edge of the motherboard.

* * * * *